United States Patent [19]

Takase

[11] Patent Number: 5,339,878
[45] Date of Patent: Aug. 23, 1994

[54] PNEUMATIC TIRES FOR MOTORCYCLES INCLUDING A SPIRALLY WOUND BELT CORD LAYER

[75] Inventor: Kiyoshi Takase, Kodaira, Japan

[73] Assignee: Bridgestone Corporation, Tokyo, Japan

[21] Appl. No.: 947,908

[22] Filed: Sep. 21, 1992

Related U.S. Application Data

[63] Continuation of Ser. No. 607,180, Oct. 31, 1990, abandoned.

[30] Foreign Application Priority Data

May 18, 1990 [JP] Japan .................. 2-126892

[51] Int. Cl.$^5$ .................. B60C 9/18; B60C 9/20; B60C 9/28
[52] U.S. Cl. .................. 152/527; 152/531; 152/534; 152/535; 152/536; 152/538
[58] Field of Search .................. 152/526, 531–533, 152/535, 536, 538, 534, 528–529

[56] References Cited

U.S. PATENT DOCUMENTS

| | | | |
|---|---|---|---|
| 3,095,027 | 6/1963 | Weber | 152/535 |
| 3,850,219 | 11/1974 | Snyder | 152/538 |
| 4,146,415 | 3/1979 | Caretta et al. | 152/531 |
| 4,773,462 | 9/1988 | Ohkuni et al. | |
| 4,869,307 | 9/1988 | Bormann et al. | 152/533 |
| 4,880,043 | 2/1989 | Decima et al. | |
| 5,014,761 | 5/1991 | Noma | 152/454 |

FOREIGN PATENT DOCUMENTS

| | | | |
|---|---|---|---|
| 0333434 | 9/1989 | European Pat. Off. | |
| 0361871 | 4/1990 | European Pat. Off. | |
| 3231547 | 3/1984 | Fed. Rep. of Germany | 152/531 |
| 3535064 | 4/1986 | Fed. Rep. of Germany | |
| 56-71604 | 6/1981 | Japan | 152/553 |
| 60-219103 | 11/1985 | Japan | 152/526 |
| 1-109106 | 4/1989 | Japan | 152/526 |
| 1-109107 | 4/1989 | Japan | 152/526 |
| 2088308 | 3/1990 | Japan | 152/526 |
| 2157239 | 3/1985 | United Kingdom | |

OTHER PUBLICATIONS

European Search Report.

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A pneumatic tire for motorcycles comprises a tread, a pair of sidewalls each toroidally extending from each side end of the tread, a carcass comprised of at least one cord ply arranged at a cord angle of 75°90° with respect to an equator of the tire, and a belt arranged between the tread and the carcass and comprised of at least two cord layers. In this tire, the belt is comprised of at least innermost cord layer located at a carcass side and at least one cord layer located at a tread side and comprised of a cord spirally wound in the circumferential direction of the tire so as to extend in the widthwise direction of the tire, in which a widthwise end of at least one cord layer located at the carcass side is located within a particular region to tread width and sidewall height.

6 Claims, 2 Drawing Sheets

FIG_1
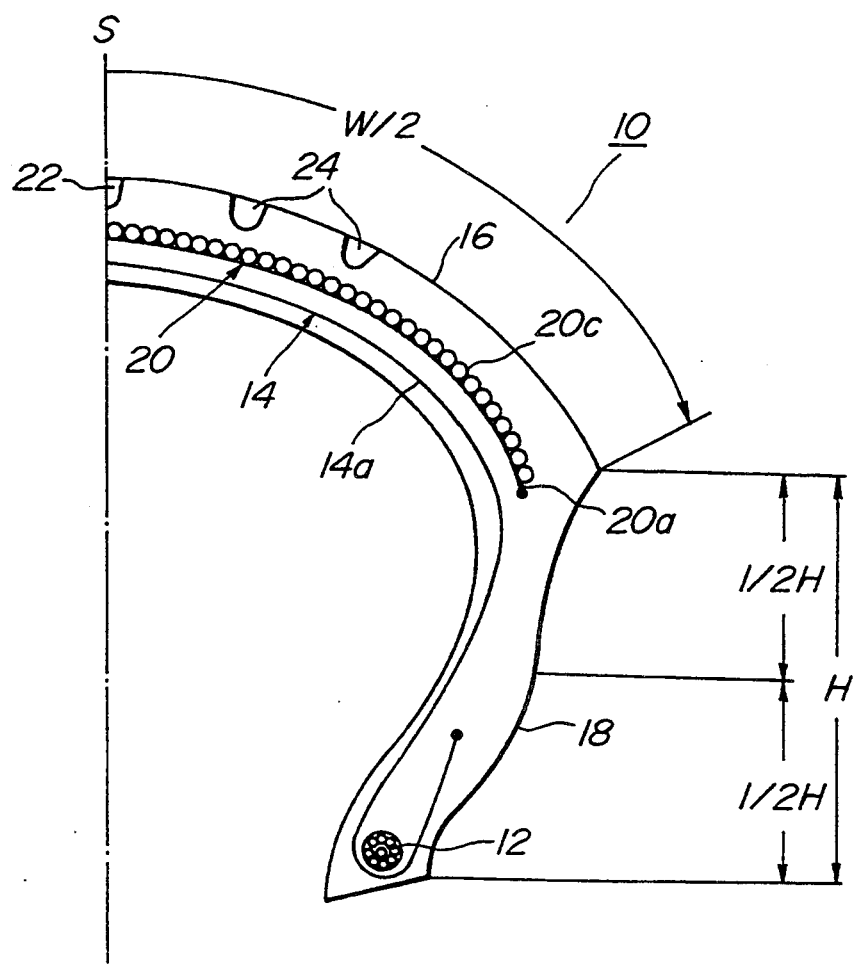

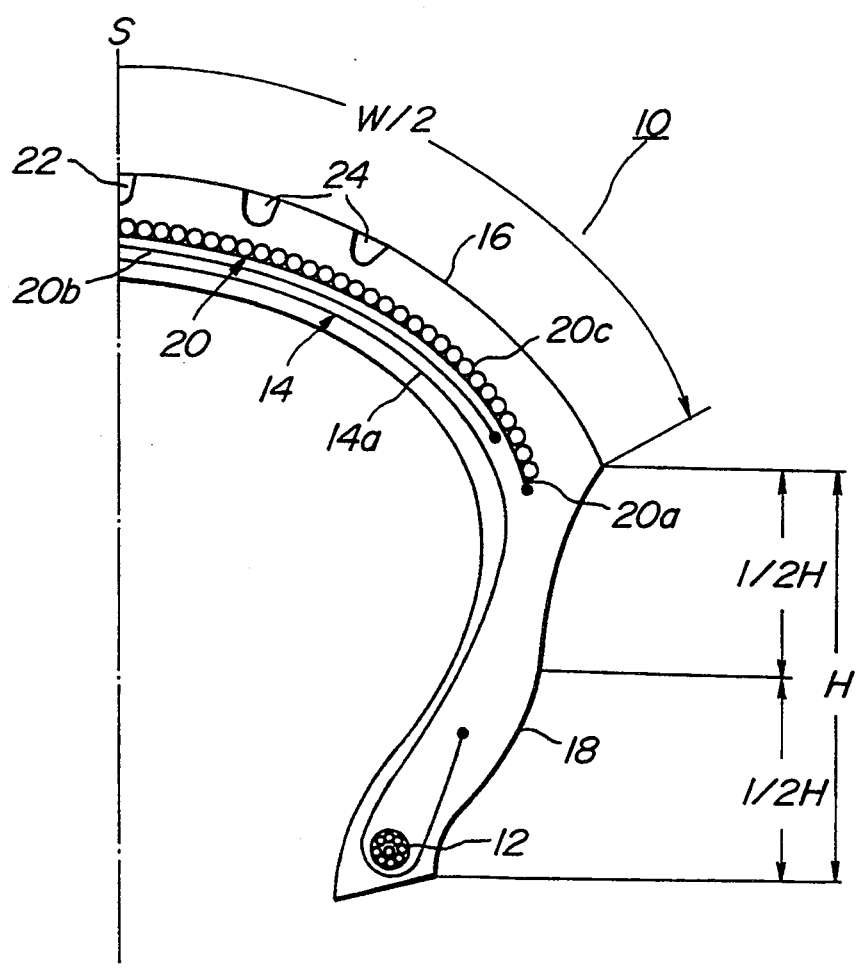
FIG_2

PNEUMATIC TIRES FOR MOTORCYCLES INCLUDING A SPIRALLY WOUND BELT CORD LAYER

This is a Continuation of U.S. application No. 07/607,180 filed Oct. 31, 1990, now abandoned.

BACKGROUND OF THE INVENTION

1. Field of the Invention

This invention relates to a pneumatic tire for motorcycles possessing good high-speed running stability, gripping property, ground contacting property and rigid feeling.

2. Related Art Statement

As this type of the tire, there are pneumatic radial tires for motorcycles comprising a carcass ply comprised of organic fiber cords arranged at a cord angle of 75°-90° with respect to an equator of the tire and a belt superimposed about an outer periphery of the carcass ply and comprised of a belt layer extending in the widthwise direction of the tire. The belt layer is formed by spirally winding a cord having a modulus of elasticity of not less than 600 kg/mm$^2$, such as high modulus polyester fiber cord, polyvinyl alcohol fiber cord, rayon fiber cord, aromatic polyamide fiber cord or the like in the circumferential direction of the tire. In these tires, the bulging of the tread outward in the radial direction of the tire through centrifugal force during the high-speed running can be prevented by the hoop effect of the above belt formed by the spiral winding of the cord, so that the high-speed running stability is excellent. Furthermore, since the cords for the belt are aligned in the widthwise direction of the tire by spiral winding, the bending rigidity of the tread in the radial direction of the tire is small, and consequently the ground contacting property becomes excellent.

The radial tire provided with the belt of spirally wound cord layer has many merits as mentioned above, however, the bending rigidity in the radial direction of the tire is small owing to the belt structure itself, so that the laterally rigid feeling is lacking.

In order to enhance the lateral rigidity in the motorcycle tire, it is generally attempted to increase the number of plies constituting the carcass, or to extend the reinforcing member for the bead portion toward the tread end, or the like. However, in the former case, the rigidity as a whole of the tire including not only tread but also sidewall becomes high and particularly the rigidity of the sidewall becomes relatively high. It is unavoidable to degrade the gripping property and the steering property. In the later case, the rigidity of the sidewall becomes excessively high, so that there is a problem that the gripping property and the steering property are degraded in the cornering.

SUMMARY OF THE INVENTION

In the motorcycle tire, the tread is continued to the sidewall at a considerable curvature, which is different from the tread of the four-wheeled tire. A tread width contacting with ground during the running is about ⅓ of full tread width at most, so that the tread of the motorcycle tire possesses not only a function gripping road surface but also a function serving as a sidewall. With the foregoing in mind, the invention is to provide a pneumatic tire for motorcycles having improved gripping property and rigid feeling with holding such a merit that the high-speed running stability and the ground contacting property are excellent when using the belt comprised of spirally wound cord.

According to the invention, there is the provision of a pneumatic tire for motorcycles comprising a tread, a pair of sidewalls each toroidally extending from each side end of the tread, a carcass comprised of at least one ply containing organic fiber cords arranged at a cord angle of 75°-90° with respect to an equator of the tire and turned around a bead ring embedded in an inward portion in radial direction of the sidewall from inside of the tire toward outside thereof, and a belt arranged between the tread and the carcass and comprised of at least two cord layers, characterized in that at least the innermost cord layer of the belt located at a carcass side contains cords arranged at a cord angle of 40°-90° with respect to the equator of the tire. At least one cord layer is located at a tread side and contains a cord spirally wound in the circumferential direction of the tire and extended in the widthwise direction of the tire over substantially a full width of the tread. A widthwise end of at least one cord layer inclusive of the innermost cord layer located at the carcass side is located within a region ranging from a position corresponding to approximately 70% of a tread width to a position extending from a tread end to ½ of a sidewall height.

In a preferable embodiment of the invention, plural cord layers are located at the carcass side in the belt and cords of these layers are crossed with each other with respect to the equator of the tire.

BRIEF DESCRIPTION OF THE DRAWINGS

The invention will be described with reference to the accompanying drawings, wherein:

FIGS. 1 and 2 are schematically radial section views of various embodiments of the pneumatic radial tire according to the invention, respectively.

DESCRIPTION OF THE PREFERRED EMBODIMENTS

In the pneumatic motorcycle tire according to the invention, the bulging of the tread outward in the radial direction of the tire is restrained by the cord layer for the belt, which is located at the tread side and formed by spirally winding the cord in the circumferential direction of the tire, so as to extend in the widthwise direction of the tread. Also the rigidity of the tread in the lateral direction of the tire is given by the cord layer for the belt located at the carcass side and containing cords arranged at a cord angle of 40°-90° with respect to the equator of the tire with the holding of elastically flexible feeling of the sidewall, so that the gripping property and the rigid feeling can be improved without damaging the high-speed running stability and the ground contacting property.

Further, the rigidity of the tread can be more enhanced with the holding of the elastically flexible feeling of the sidewall by crossing the cords of the plural cord layers located at the carcass side with each other.

A preferable embodiment of the pneumatic tire for motorcycles according to the invention will be described in detail with reference to the accompanying drawings.

In FIG. 1 is schematically shown a right-half section of a first preferable embodiment of the pneumatic tire for motorcycle according to the invention with respect to an equatorial plane S of the tire. Of course, the tire 10 is substantially symmetric with respect to the equatorial plane S.

A carcass 14 is wound around each of a pair of annular bead cores 12 from inside of the tire toward outside thereof and comprises of at least one rubberized ply 14a containing organic fiber cords such as nylon fiber cords, polyester fiber cords, rayon fiber cords, high-modulus polyester fiber cords or the like arranged at a cord angle of 75°–90° with respect to the equatorial plane S. In the illustrated embodiment, the carcass 14 is comprised of one rubberized carcass ply containing nylon cords of 1260 d/2. A tread 16 forming a ground contacting portion of the tire is toroidally connected at each of their side ends to a sidewall 18, and a belt 20 comprises of two cord layers is arranged between the tread 16 and the carcass 14. Moreover, numerals 22 and 24 are grooves formed in the tread 16.

In the illustrated embodiment, the belt 20 is comprised of a cord layer 20a located at the carcass side and a cord layer 20c located at the tread side. A cord in the cord layer 20a is selected from the group consisting of nylon fiber cord, polyester fiber cord, high-modulus polyester fiber cord, polyvinyl alcohol fiber cord and aromatic polyamide fiber cord, preferably nylon fiber cord, which is arranged at a cord angle of 40°–90° with respect to the equatorial plane S.

Furthermore, the cord layer 20a has such a width that a widthwise end of the cord layer 20a is located within a region ranging from a position corresponding to approximately 70% of a width (W) of the tread 16 to a position extending from a tread end to ½ of a height (H) of the sidewall 18.

The reason why the position of the widthwise end of the cord layer 20a is limited to the above region is due to the fact that the lateral rigidity of a portion ranging from the tread 16 to the sidewall 18 is enhanced uniformly without losing the elastically flexible feeling of the sidewall 18. Particularly, when the elastically flexible feeling of the sidewall 18 is required, the width of the cord layer 20a is sufficient to be approximately equal to 70% of the width (W) of the tread 16. If the width is less than approximately 70% of the tread width, the rigidity of the tread 16 lowers and consequently the desired rigid feeling is lost. On the other hand, when the widthwise end of the cord layer 20a isolated at the bead core side exceeding the ½ of the height (H) of the sidewall 18, the elastically flexible feeling of the sidewall 18 is lost.

The cord layer 20c located at the tread side is comprised of an organic fiber cord having a high modulus of elasticity, such as high-modulus polyester fiber cord, polyvinyl alcohol fiber cord, rayon fiber cord or aromatic polyamide fiber cord having a modulus of elasticity of not less than 600 kg/mm$^2$, which is spirally wound outside the cord layer 20a and extended in the widthwise direction of the tire. The cord layer 20c acts to suppress the bulging of the carcass 14 and the cord layer 20a outward in the radial direction of the tire and prevents the motion of the tread 16 in the radial direction to reduce the heat generation of the tire, whereby the high-speed running is made possible and also the given tread pattern is maintained to improve the gripping property of the tire. By such a construction of the belt, the rigidity in the lateral direction of the tire is enhanced without increasing the carcass ply number and also the elastically flexible feeling of the sidewall can substantially be maintained, so that the ground contacting property of the tread is never damaged.

In FIG. 2 is schematically shown a right-half radial section of a second embodiment of the motorcycle pneumatic tire according to the invention. Moreover, the same portion of the tire as in FIG. 1 is represented by the same numerals as in FIG. 1.

The tire of the illustrated embodiment has substantially the same structure as in the embodiment of FIG. 1 except that the belt 20 located between the tread 16 toroidally connecting to the sidewall 18 and the carcass 14 is comprised of three cord layers.

That is, the belt 20 comprises two cord layers 20a and 20b located at the carcass side and a cord layer 20c located at the tread side. The cords of the cord layers 20a and 20b located at the carcass side are arranged at a cord angle of 40°–90° with respect to the equatorial plane S of the tire, respectively.

Even in this embodiment, either one of the cord layers 20a and 20b, particularly the cord layer 20a in the illustrated embodiment has such a width that the widthwise end is located within a region ranging from a position corresponding to approximately 70% of a width (W) of the tread 16 to a position extending from a tread end to ½ of a height (H) of the sidewall 18. Thus, the lateral rigidity of a portion ranging from the tread 16 to the sidewall 18 can be enhanced uniformly without losing the elastically flexible feeling of the sidewall 18.

Of course, the widths of both the cord layers are made equal to each other within the above region, if necessary, or the width of the cord layer 20b can be selected so as to satisfy the position of the widthwise end within the aforementioned region. When the number of cord layers located at the carcass side is 3 or more, the widthwise end in at least one cord layer is enough to locate within the above region. In these cord layers, the cords are crossed with each other with respect to the equatorial plane of the tire. Moreover, when the cord angle is 90° with respect to the equatorial plane, the cords of these cord layers may be aligned in the same direction.

In the embodiment of FIG. 2, the cord layer 20c arranged outside the cord layers 20a and 20b and at the tread side is comprised of the cord spirally wound in the circumferential direction and extending in the widthwise direction in the same manner as in the embodiment of FIG. 1 and has a width approximately equal to the tread width W, whereby the bulging of the tread outward in the radial direction of the tire can effectively be prevented. Moreover, the number of cord layers located at the tread side and constituted by the spiral winding of the cord may naturally be two or more, if necessary.

The following example is given in illustration of the invention and is not intended as limitation thereof.

EXAMPLE

The high-speed running stability, gripping property, ground contacting property and rigid feeling were evaluated by using four invention tires and two comparative tires as follows.

| [Dimensions of test tire] | |
|---|---|
| Size: | MCR 150/60 R17 |
| Carcass: | single ply containing nylon-6,6 cords of 1260d/2 arranged at a cord angle of 90° with respect to the equatorial plane of the tire |

Invention tire A

This tire had a structure shown in FIG. 2, in which each of two cord layers located at the carcass side contained nylon-6,6 cords of 840d/2 arranged at a cord angle of 75° with respect to the equatorial plane of the tire so as to cross cords of these layers with each other, and the width of the innermost cord layer was equal to tread width (W) and the width of the cord layer adjacent thereto was 0.9 times of tread width (W), and the cord layer located at the tread side was comprised of Kevlar (trade name) cord of 1500d/2 spirally wound in the circumferential direction substantially in parallel to the equatorial plane and had a width corresponding to 0.95 times of tread width (W).

Invention tire B

This tire had the same structure as in the invention tire A except that the two cord layers located at the carcass side had a cord angle of 60° with respect to the equatorial plane of the tire.

Invention tire C

This tire had a structure shown in FIG. 1, in which the cord layer located at the carcass side contained nylon-6,6 cords of 840d/2 arranged at a cord angle of 60° with respect to the equatorial plane of the tire and had a width equal to tread width (W), and the cord layer located at the tread side was comprised of Kevlar (trade name) cord of 1500d/2 spirally wound in the circumferential direction substantially in parallel to the equatorial plane and had a width corresponding to 0.95 times of tread width (W).

Invention tire D

This tire has the same structure as in the invention tire C except that the width of the cord layer located at the carcass side was 0.8 times of tread width (W).

Comparative tire 1

This tire had the same structure as in the invention tire C except that the width of the cord layer located at the carcass side was 0.6 times of tread width (W).

Comparative tire 2

This tire was provided with a belt of a single cord layer comprised of Kevlar (trade name) cord of 1500d/2 spirally wound in the circumferential direction substantially in parallel to the equatorial plane and having a width equal to tread width (W).

Test method

A front tire having a tire size of 110/70 R17 and comprising a carcass comprised of two rubberized plies each containing nylon-6,6 cords of 840 d/2 arranged at a cord angle of 75° with respect to the equatorial plane, cords of which plies being crossed with each other, and a belt comprised of two cord layers each containing Kevlar cords of 1500 d/2 arranged at a cord angle of 22° with respect to the equatorial plane. The cords of which layers are crossed with each other and widths of which layers being 97% of tread width at the tread side and 82% thereof at the carcass side was mounted on a front wheel of a test motorcycle and each of the above test tires was mounted on a rear wheel of the same test motorcycle. Then, the motorcycle was actually run on road, during which the high-speed running stability, gripping property, ground contacting property and rigid feeling were measured at ten-point stage by feeling test to obtain results as shown in the following Table 1, in which the larger the numerical value, the better the property.

TABLE 1

|  | High-speed running stability | Gripping property | Ground contacting property | Rigid feeling |
| --- | --- | --- | --- | --- |
| Invention tire A | 8 | 8 | 7 | 8 |
| Invention tire B | 7 | 8 | 6 | 9 |
| Invention tire C | 8 | 8 | 7 | 8 |
| Invention tire D | 8 | 7 | 7 | 7 |
| Comparative tire 1 | 8 | 6 | 7 | 6 |
| Comparative tire 2 | 8 | 7 | 8 | 6 |

As seen from Table 1, the high-speed running stability and the gripping property are not damaged, and the rigidity can be enhanced while controlling the ground contacting property at minimum in the invention tires A to D as compared with the comparative tires 1 and 2.

Moreover, the invention is not limited to the above embodiments and various modifications may be taken within the scope of the invention. For example, plural carcass plies may be used in accordance with the specification of the tire, or plural cord layers each comprised of spirally wound cord extending in the widthwise direction of the tire over the full width of the tread may be arranged. Moreover, the motorcycle pneumatic tire according to the invention can be applied to either a front wheel or a rear wheel or both of a motorcycle.

As mentioned above, the invention can provide pneumatic tires for motorcycles having improved rigid feeling without losing the high-speed running stability and the gripping property.

What is claimed is:

1. A pneumatic motorcycle tire comprising; a tread extending to substantially a maximum width of said motorcycle tire, a pair of sidewalls each toroidally extending from each side end of the tread, a carcass comprised of at least one ply containing organic fiber cords arranged at a cord angle of 75°–90° with respect to an equator of the motorcycle tire and turned around a bead ring embedded in an inward portion in radial direction of the sidewall from inside of the motorcycle tire toward outside thereof, a belt arranged between the tread and the carcass and comprised of at least two cord layers, at least an innermost cord layer on the belt located at a carcass side contains nylon fiber cords arranged at a cord angle of 60°–90° with respect to the equator of the tire, and at least one cord layer located at said tread side containing a cord having a modulus of elasticity of not less than 600 kg/mm$^2$ which is selected from the group consisting of high-modulus polyester fiber cord, polyvinyl alcohol fiber cord, rayon fiber cord and aromatic polyamide fiber cord, said at least one cord layer located at said tread side being spirally wound in the circumferential direction of the motorcycle tire and extending in the widthwise direction of the tire over substantially a full width of the tread to control outward expansion of the tire in the radial direction, and a widthwise end of at least one cord layer inclusive of the innermost cord layer located at the carcass side is located within a region ranging from a position corresponding to approximately 70% of a tread width to a position extending from a tread end to ½ of a sidewall height.

2. The pneumatic motorcycle tire according to claim 1, wherein plural cord layers are located at the carcass side in the belt and cords of these layers are crossed with each other with respect to the equator of the tire.

3. The pneumatic motorcycle tire according to claim 1, wherein the tread side cord layer has a width of 95% of said tread width.

4. The pneumatic motorcycle tire according to claim 2, wherein the width of the tread side cord layer is 95% of said tread width and the width of the carcass side cord layer is 90% of said tread width.

5. A pneumatic motorcycle tire of claim 1, wherein said at least two cord layers forming said belt are arranged adjacent each other.

6. A pneumatic motorcycle tire of claim 1, wherein said belt consists of a single innermost cord layer located at said carcass side and a single cord layer located at said tread side.

* * * * *